United States Patent [19]

Thomas, Jr.

[11] Patent Number: 5,535,346
[45] Date of Patent: Jul. 9, 1996

[54] DATA PROCESSOR WITH FUTURE FILE WITH PARALLEL UPDATE AND METHOD OF OPERATION

[75] Inventor: Thomas L. Thomas, Jr., Austin, Tex.

[73] Assignee: Motorola, Inc., Schaumburg, Ill.

[21] Appl. No.: 270,342

[22] Filed: Jul. 5, 1994

[51] Int. Cl.$^6$ ........................................... G06F 9/34
[52] U.S. Cl. .................... 395/375; 395/250; 395/182.13; 395/800
[58] Field of Search ........................... 395/250, 375, 395/800, 182.13

[56] References Cited

U.S. PATENT DOCUMENTS

| | | | |
|---|---|---|---|
| 5,129,067 | 7/1992 | Johnson | 395/375 |
| 5,136,697 | 8/1992 | Johnson | 395/375 |
| 5,155,817 | 10/1992 | Kishigami et al. | 395/375 |
| 5,355,457 | 10/1994 | Shebanon et al. | 395/375 |
| 5,404,470 | 4/1995 | Miyake | 395/375 |

OTHER PUBLICATIONS

IEEE, 1985; "Implementation of Precise Interrupts in Pipelined Processors," Smith & Pleszkun, pp. 36–41.
Superscalar Microprocessor Design, Johnson; pp. 94–95.

*Primary Examiner*—Ken S. Kim
*Attorney, Agent, or Firm*—Lee E. Chastain

[57] ABSTRACT

The disclosed data processor (10) has a future file (60) for providing the most recent value of a set of architectural registers (32, 36) to the various execution units (20, 22, 24, 26, 28, 30) of the data processor. The most recent value of the set of architectural registers is determined with respect to the original instruction sequence. The future file provides a single source for operand look-up at instruction dispatch and can be corrected in a single cycle in the event of an exception condition.

20 Claims, 7 Drawing Sheets

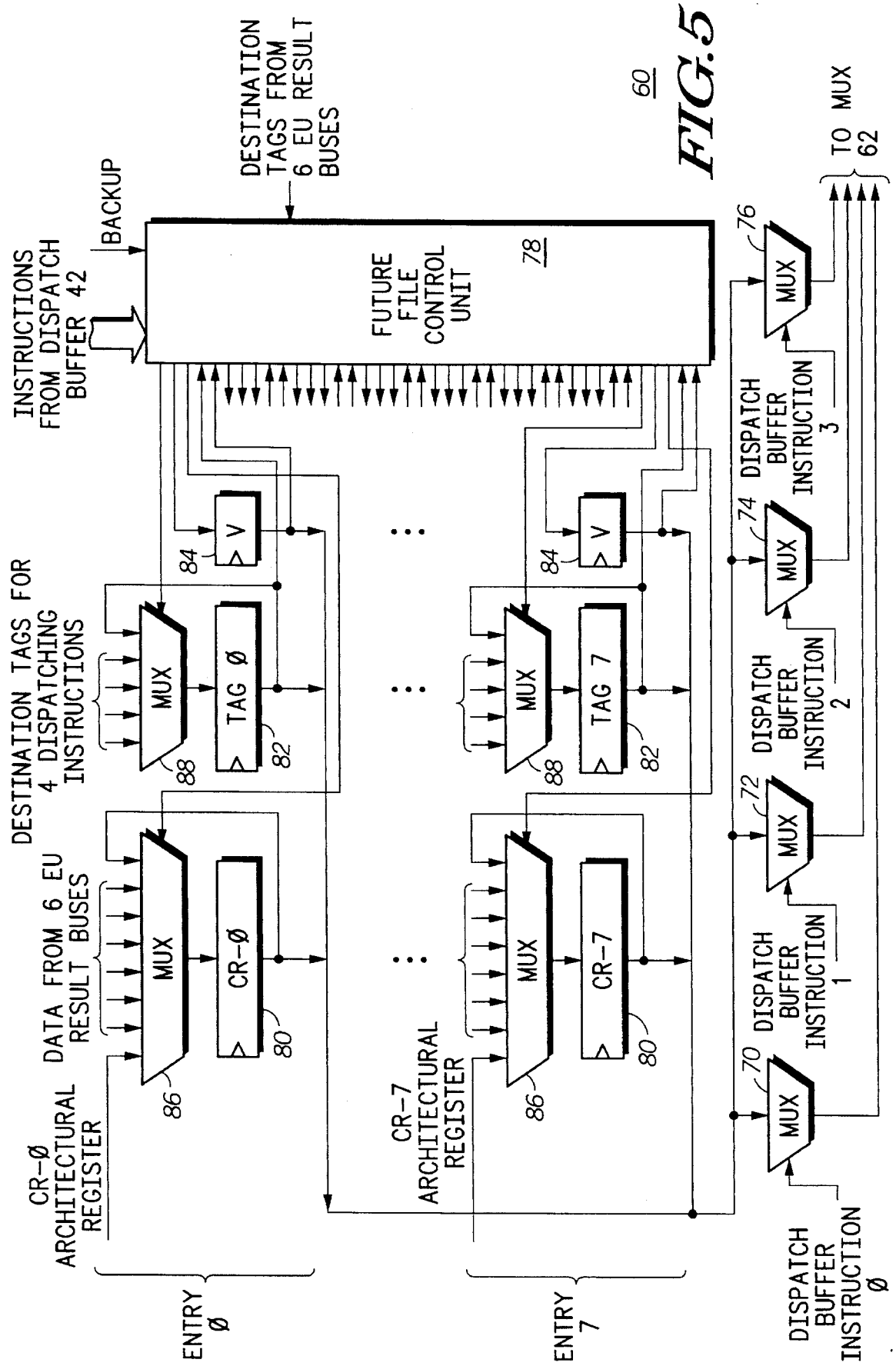

1

DATA PROCESSOR WITH FUTURE FILE WITH PARALLEL UPDATE AND METHOD OF OPERATION

FIELD OF THE INVENTION

The present invention generally relates to digital computing systems, and more specifically to data processors which finish instructions out of order.

BACKGROUND OF THE INVENTION

Modern integrated data processors achieve remarkable performance by incorporating advanced features once the exclusive domain of main frame class processing systems: instruction pipelining, superscalar instruction dispatch, and out-of-order instruction execution. These strategies increase the number of instructions executed per clock cycle. Unfortunately, these strategies also increase the complexity of modern integrated data processors.

The advanced features of modern integrated data processors increase their complexity in at least two ways. First, a data processor must now carefully coordinate when it updates a destination architectural register with the result of an instruction. Each instruction must update its destination architectural register in the original program order if the data processor is to be considered "precise." Precise data processors appear to have not executed any instructions following an instruction that causes an exception. Similarly, precise data processors appear to have executed all instructions preceding the instruction that causes the exception. The advanced features and complications of a precise data processor are invisible to a software programmer. Second, high instruction completion rate requires a high performance instruction operand supply during instruction dispatch. The instruction operands need to be available as soon as the operands are determined by preceding instructions and must be easily accessible from wherever they are stored.

Reorder or rename buffers are often used to coordinate when each instruction copies its result to the appropriate architectural register. Coordinating circuitry allocates a unique entry in these buffers to receive each instruction's result when the instruction is dispatched. Each execution unit writes its result into the specified entry whenever it finishes executing the instruction. This order usually does not parallel the original instruction order. These buffers, in turn, write the contents of each one of their entries to the appropriate architectural destination register when the instruction that generated the contents is the oldest instruction in the data processor. Reorder and rename buffers are typically first-in-first-out ("FIFO") queues. Therefore, the oldest instruction can be determined by maintaining a pointer specifying the first dispatched instruction.

Future files are often used to provide instruction operands quickly at instruction dispatch. Future files maintain a list of the most recent value with respect to the original program order of some or all of the architectural registers. The contents of a future file are also stored in a reorder or rename buffer along with older values of the same architectural registers. If no instruction generates an exception, then the reorder buffer will write its copy of the future file data into the architectural register at some "future" time. Therefore, the future file can provide a copy of the most current expected value of a particular architectural register from one convenient location for instruction dispatch. Also, the future file provides its data to an instruction execution unit before the reorder buffer writes its copy of the data to the appropriate architectural register. The execution unit need not wait for the reorder or rename buffer to update the appropriate architectural register before the execution unit begins instruction execution.

Two future file architectures have been widely discussed: James E. Smith and Andrew R. Pleszkun, Implementation of Precise Interrupts in Pipelined Processor, in 12th Annual Symposium on Computer Architecture, at 41 (IEEE, June 1985) and Mike Johnson, Superscalar Microprocessor Design, at 94–95 (1991). Each of these two strategies is a compromise between operand access speed and exception handling speed. The future file described by Smith and Pleszkun provides a fast lookup for operand data. However, this first future file requires numerous cycles to correct its data in the event of an exception. Conversely, the future file described by Johnson provides a slower lookup cycle for operand data. However, that future file requires only one cycle to correct the data stored in the future file in the event of an exception.

SUMMARY OF THE INVENTION

In accordance with the present invention, there is disclosed a data processor with a future file and a method of operating the same which substantially eliminates disadvantages of known data processors and schemes.

The disclosed data processor has a plurality of architectural registers, an execution unit, a rename buffer, and a future file. The execution unit executes an instruction of a series of instructions. The rename buffer stores a result of the instruction and copies the result to the plurality of architectural registers responsive to the instruction. The future file has a plurality of entries each storing a most recent value of a differing one of the plurality of architectural registers. The most recent values are determined with respect to the series of instructions. Each one of the plurality of entries provides the most recent value to the execution unit responsive to the instruction. Each one of the plurality of entries simultaneously stores a value of a differing one of the plurality of architectural registers responsive to an exception condition.

The disclosed method has the steps of receiving an instruction for execution in an execution unit of a data processor and providing to the execution unit a most recent value of an architectural register from a future file. The instruction is one of a series of instructions. The step of providing is performed responsive to the instruction. The most recent value is stored in one of a plurality of entries of the future file. Each one of the plurality of entries stores a most recent value of and is coupled to a differing one of the architectural registers.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which:

FIG. 5 depicts a block diagram of the future file depicted in FIG. 4;

DETAILED DESCRIPTION OF A PREFERRED EMBODIMENT

Figure 1:
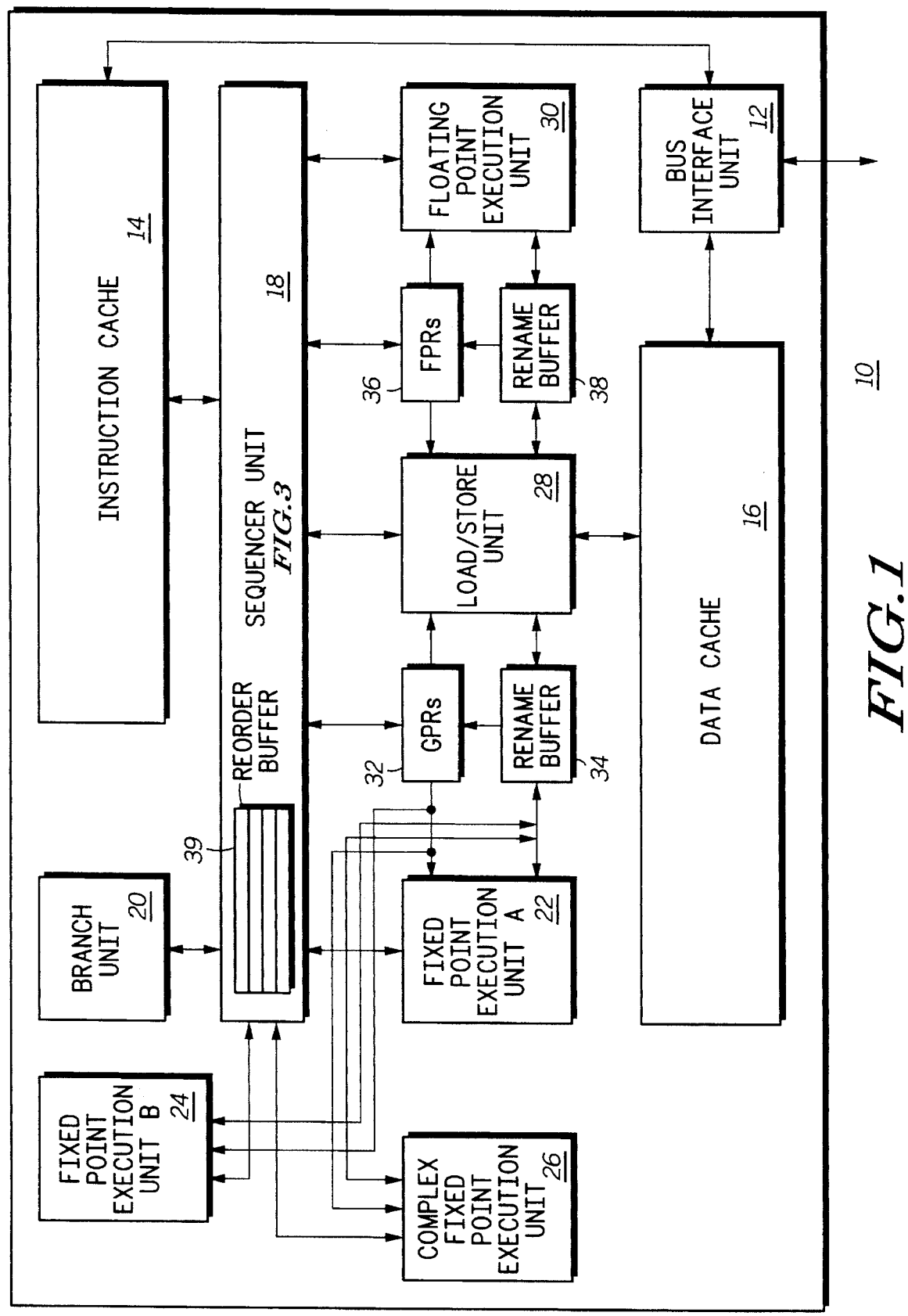
FIG. 1 depicts a block diagram of a data processor constructed in accordance with the present invention.

FIG. 1 depicts a block diagram of a data processor 10 constructed in accordance with the present invention. Data processor 10 is a high performance data processor incorporating such features as superscalar instruction dispatch, pipelined execution units and out-of-order instruction execution. The high performance features of data processor 10 cause instructions to finish in an order different from the original program order. Consequently, data processor 10 has a rename buffer and a reorder buffer to coordinate the write back of each instruction's result to a specified architectural register in the original program order. Data processor 10 also has a future file from which it can provide instruction operands to an execution unit at instruction dispatch time. The data stored in the disclosed future file can be corrected after an exception in a single cycle.

Continuing with FIG. 1, a bus interface unit (hereafter BIU) 12 controls the flow of data between data processor 10 and the remainder of a data processing system (not depicted). BIU 12 is connected to an instruction cache 14 and to a data cache 16. Instruction cache 14 supplies an instruction stream to a sequencer unit 18. Sequencer unit 18 forwards individual instructions to an appropriate execution unit. Data processor 10 has a branch unit 20, a fixed point execution unit A 22, a fixed point execution unit B 24, a complex fixed point execution unit 26, a load/store execution unit 28, and a floating point execution unit 30. Fixed point execution unit A 22, fixed point execution unit B 24, complex fixed point execution unit 26, and load/store execution unit 28 read and write their results to a general purpose architectural register file 32, (labeled GPRs and hereafter GPR file) and to a first rename buffer 34. First rename buffer 34 is more fully described below in connection with FIGS. 3 and 4. Floating point execution unit 30 and load/store execution unit 28 read and write their results to a floating point architectural register file 36, (labeled FPRs and hereafter FPR file) and to a second rename buffer 38.

The operation of data processor 10 without the disclosed invention is known in the art. In general, branch unit 20 determines what sequence of programmed instructions is appropriate given the contents of certain data registers and the instructions themselves. Instruction cache 14 provides this sequence of programmed instructions to sequencer 18. If instruction cache 14 does not contain the required instructions, then it will fetch them from a main memory system external to data processor 10 (not shown).

Sequencer unit 18 dispatches the individual instructions of the sequence of programmed instructions to the various execution units 20, 22, 24, 26, 28 and 30. Sequencer unit 18 also reserves an entry in either rename buffer 34 or 38 in which to temporarily store the result, if any, of each instruction. Both rename buffers are first-in-first-out ("FIFO") queues.

Each of the execution units performs one or more instructions of a particular class of instructions. The particular class of instructions of each execution unit is indicated by the name of the execution unit. For instance, fixed point execution units A and B perform simple mathematical operations on operands expressed in fixed point notation such as addition, subtraction, ANDing, ORing and XORing. Complex fixed point execution unit 26 performs more complex mathematical operations on operands expressed in fixed point notation such as multiplication and division. Floating point execution unit 30 performs mathematical operations on operands expressed in floating point notation such as multiplication and division.

Fixed point execution units A and B and complex fixed point unit 26 return the results of their operations to designated entries in first rename buffer 34. First rename buffer 34 periodically updates an entry of GPR file 32 with an entry from first rename buffer 34 when all instructions preceding the instruction that generated the result have updated their GPR file entries. Sequencer unit 18 maintains a reorder buffer 39 to coordinate this updating. Reorder buffer 39 is a FIFO queue that stores a portion of the programmed instruction stream in its original order. Sequencer unit 18 waits until the oldest instruction in reorder buffer 39 has completed. Then, sequencer unit 18 updates the architectural register with the result stored in the rename buffer entry allocated for the instruction. Sequencer unit 18 also invalidates the instruction's entry in reorder buffer 39 to make room for later instructions. Both first rename buffer 34 and GPR file 32 can supply operands to fixed point execution units A and B and to complex fixed point unit 26.

Floating point execution unit 30 returns the results of its operations to designated entries in second rename buffer 38. Second rename buffer 38 periodically updates an entry of FPR file 36 with an entry in second rename buffer 38 when all instructions preceding the instruction that generated the result have updated their FPR file entries. Sequencer unit 18 also coordinates this updating. Both second rename buffer 38 and FPR file 36 supply operands to floating point execution unit 30.

Load/store unit 28 reads data stored in GPR file 32, or FPR file 36 at completion time and writes the selected data to data cache 16. This data may also be written to an external memory system (not depicted) depending upon operating characteristics of data processor 10 not relevant to the disclosed invention. Conversely, load/store unit 28 reads data stored in data cache 16 and writes the read data to first rename buffer 34 or second rename buffer 38. If data cache 16 does not contain the required data, then it will fetch it from the main memory system external to data processor 10 via BIU 12.

The operation of data processor 10 with the disclosed invention is described below in connection with FIGS. 2 through 4. In general, data processor 10 is a reduced instruction set computer ("RISC"). Data processor 10 achieves high performance by breaking each instruction into a sequence of smaller steps, each of which may be overlapped in time with steps of other instructions. This performance strategy is known as "pipe lining."

Figure 2:
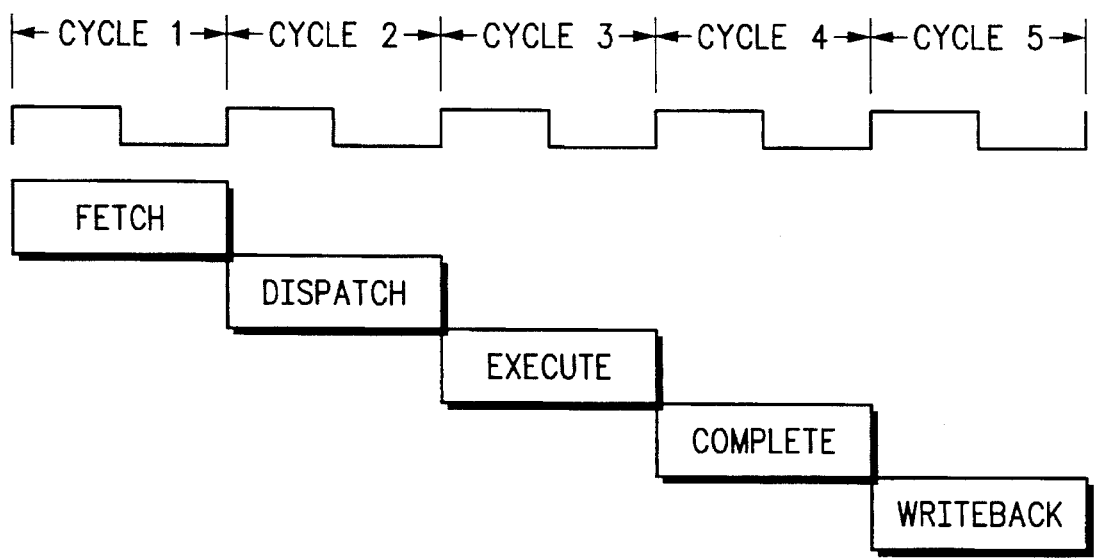
FIG. 2 depicts a timing diagram of an instruction executed by the data processor depicted in FIG. 1.

FIG. 2 depicts a timing diagram of an instruction executed by data processor 10 depicted in FIG. 1. In the depicted embodiment, each instruction is broken into five discrete steps: fetch, dispatch, execute, complete, and writeback.

In the fetch stage, memory management circuitry (not shown) within instruction cache 14 retrieves one or more instructions beginning at a memory address identified by sequencer unit 18 or by branch unit 20 in the prior clock cycle.

In the dispatch stage, sequencer unit 18 routes each instruction to the appropriate execution unit after determining that there are no impermissible data or resource dependencies and after reserving a rename buffer entry for the result of the instruction. The dispatch stage is also responsible for supplying operand information for the instructions being dispatched. If one or more operands are not yet available, the dispatch stage supplies a tag identifying the rename buffer entry from which the opened may be read in the future. Each one of the execution units stores its particular instruction in a reservation station until it receives all the necessary operand information to perform the instruction. A future file (depicted in FIG. 5) in sequencer unit 18 provides operands for branch unit 20. However, it should be understood that the disclosed future file may be replicated elsewhere in data processor 10 to provide different operands to different execution units.

In the execute stage, each particular execution unit receives all (or some) of the necessary operand information and is therefore able to begin performing its programmed instruction. Results, if any, are returned either to first rename buffer 34 or second rename buffer 38, respectively, for integer and floating point results.

In the complete stage, sequencer unit 18 determines which instructions can write back their results in the following stage.

In the writeback stage, sequencer unit 18 updates the architectural register files with the result or results of one or more instructions stored in rename buffers 34 and 38 after every instruction preceding the instructions has so updated the architectural register files or is updating the architectural register files in the same cycle. An instruction or group of instructions are the oldest instructions in reorder buffer 39 when this criteria is met. The writeback stage also updates all other architectural states in the machine after every instruction preceding the particular instruction has so updated the architectural state.

Generally, each instruction stage takes one machine clock cycle. However, some instructions, such as complex fixed point instructions, require more than one clock cycle to execute. Therefore, there may be a delay between the execution and completion stages of a particular instruction due to the range of times which previous instructions may have taken to execute.

Figure 3:
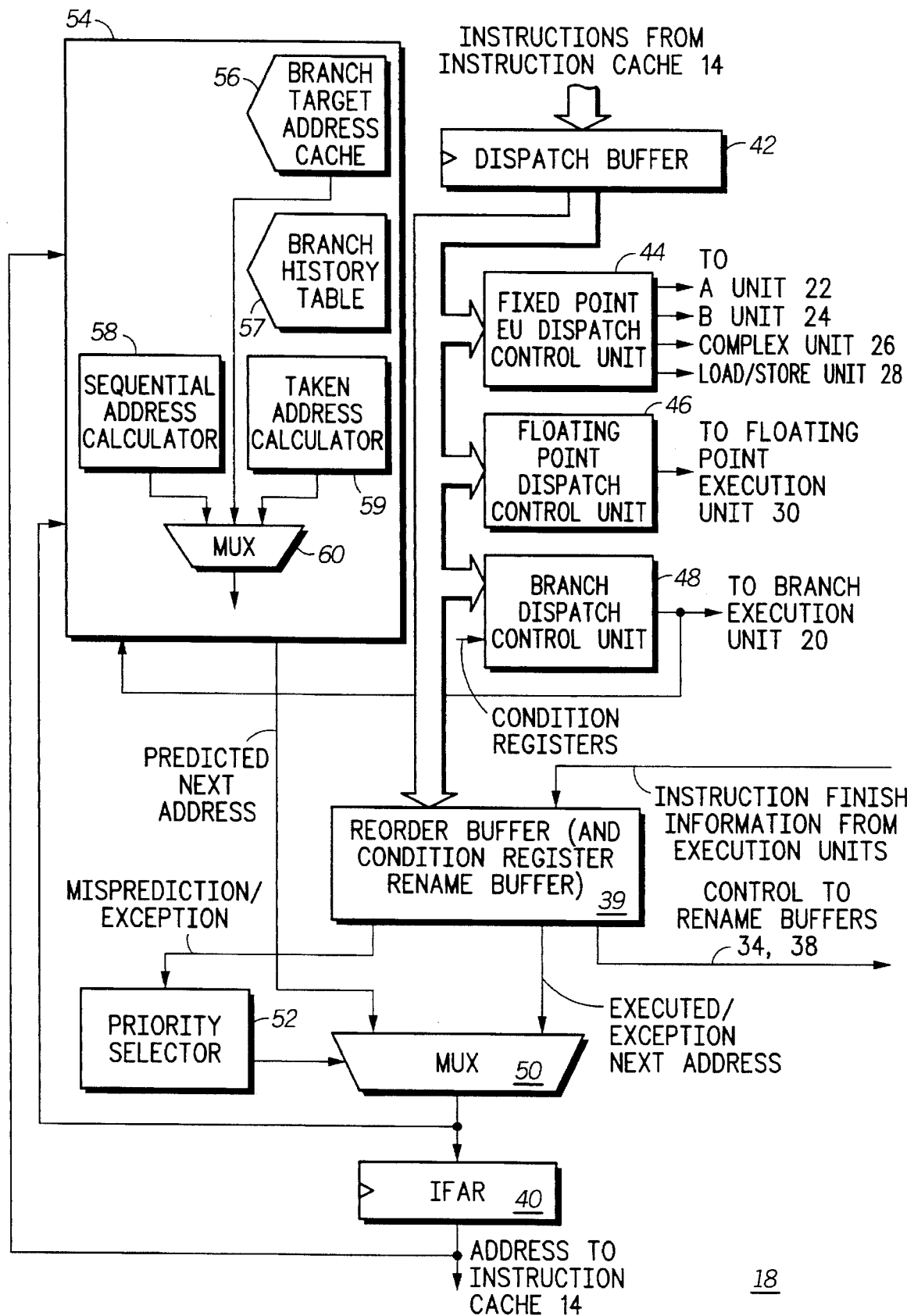
FIG. 3 depicts a block diagram of the sequencer unit depicted in FIG. 1.

FIG. 3 depicts a block diagram of sequencer unit 18 depicted in FIG. 1. An instruction fetch address register (labeled and hereafter "IFAR") 40 generates a "fetch address" each clock cycle beginning at which instruction cache 14 supplies four instructions to a dispatch buffer 42. In the depicted embodiment, dispatch buffer 42 latches zero, two or four of the four supplied instructions each cycle depending upon how many instructions it dispatched to the various execution units in the prior cycle.

Dispatch buffer 42 routes the four instructions eligible for dispatch to a fixed point execution unit ("EU") dispatch control unit 44, a floating point execution unit dispatch control unit 46, and a branch dispatch control unit 48. These three dispatch control units dispatch the various instructions to the appropriate execution unit after determining that there are no impermissible data dependencies within the group of dispatched instructions. In particular, fixed point execution unit dispatch control unit 44 dispatches instructions to fixed point execution unit A 22 (labeled "To A Unit 22"), to fixed point execution unit B 24 (labeled "To B Unit 24"), to complex fixed point execution unit 26 (labeled "To Complex Unit 26"), and to load/store unit 28. Similarly, floating point execution unit dispatch control unit 46 and branch dispatch control unit 48 dispatch instructions to floating point execution unit 30 and to branch unit 20, respectively.

Dispatch buffer 42 also routes the four instructions eligible for dispatch to reorder buffer 39. Reorder buffer 39 assigns each instruction a sequential tag identifying the instruction's order relative to the other instructions and a destination tag identifying a location in rename buffer 34 or rename buffer 36 to which the execution unit calculating the result will write back its result. (In the depicted embodiment, certain small instruction results are written to a field in reorder buffer 39. In this case, the sequential reorder buffer tag acts as the destination tag. The eight four-bit condition registers, or CR's, are treated this way.) Reorder buffer 39 receives information from the various execution units about each instruction after the instruction executes. As described above, reorder buffer 39 can then coordinate the writing of instruction results from rename buffers 34 and 38 to GPR file 32 and FPR file 36.

IFAR 40 receives the fetch address from the output of a two input multiplexer 50. A priority selector 52 chooses which of two addresses multiplexer 50 outputs: (1) a predicted next address from a branch prediction unit 54 calculated during each instruction's fetch and dispatch stage, or (2) an execute/exception address calculated during each instruction's execute stage. A mis-executed instruction or a branch instruction generates the execute/exception address. Priority selector 52 chooses the fetch address generated by the oldest instruction, number (2), if it is valid.

Branch prediction unit 54 incorporates a branch address target address cache (hereafter "BTAC") 56, a branch history table (hereafter "BHT") 57, a sequential address calculator 58, and a taken address calculator 59 to predict the fetch address of each instruction during the instruction's fetch and dispatch stage. An output of a multiplexer 60 selects the appropriate predicted next address. Branch prediction unit 54 outputs the dispatch stage address calculation if it differs from the instruction's fetch stage address. Otherwise, branch prediction unit 54 outputs the fetch stage prediction.

BTAC 56 stores a number of recently encountered fetch address-target address pairs for fetch stage branch prediction. Branch prediction unit 54 outputs a stored target address to multiplexer 50 if the corresponding fetch address is logically equivalent to the contents of IFAR 40 during the previous cycle. Otherwise branch prediction unit 54 outputs a fetch address generated by sequential address calculator 59. (A previously dispatched branch instruction may simultaneously generate a dispatch stage fetch address. In this case, branch prediction unit 54 selects either the output of sequential address calculator 58 or taken address calculator 59.) Sequential address calculator 59 generates a sequential address by adding zero, two or four (depending upon the number of previously dispatched instructions) to the previous value of IFAR 40.

BHT 57 stores a branch state for a number of recently encountered branch instructions for dispatch stage prediction. In the depicted embodiment, BHT 57 employs a four state branch prediction model: strong-not-taken, weak-not-taken, weak-taken and strong-taken. Branch prediction unit 54 predicts that the branch instruction will be taken if the instruction's branch state is weak-taken or strong-taken. Taken address calculator 59 calculates the taken target address responsive to a field in the branch instruction, an absolute or offset address. Branch prediction unit 54 predicts that the branch instruction will not be taken if the instruction's branch state is weak-not-taken or strong-not-taken. Sequential address calculator 58 calculates a sequential address for the not taken target address. Branch dispatch control unit 48 can also override BHT 57 if the branch operand is available during instruction dispatch. If the operand is available, then branch dispatch control unit 48 will select the taken or not taken fetch address as specified by the operand.

Figure 4:
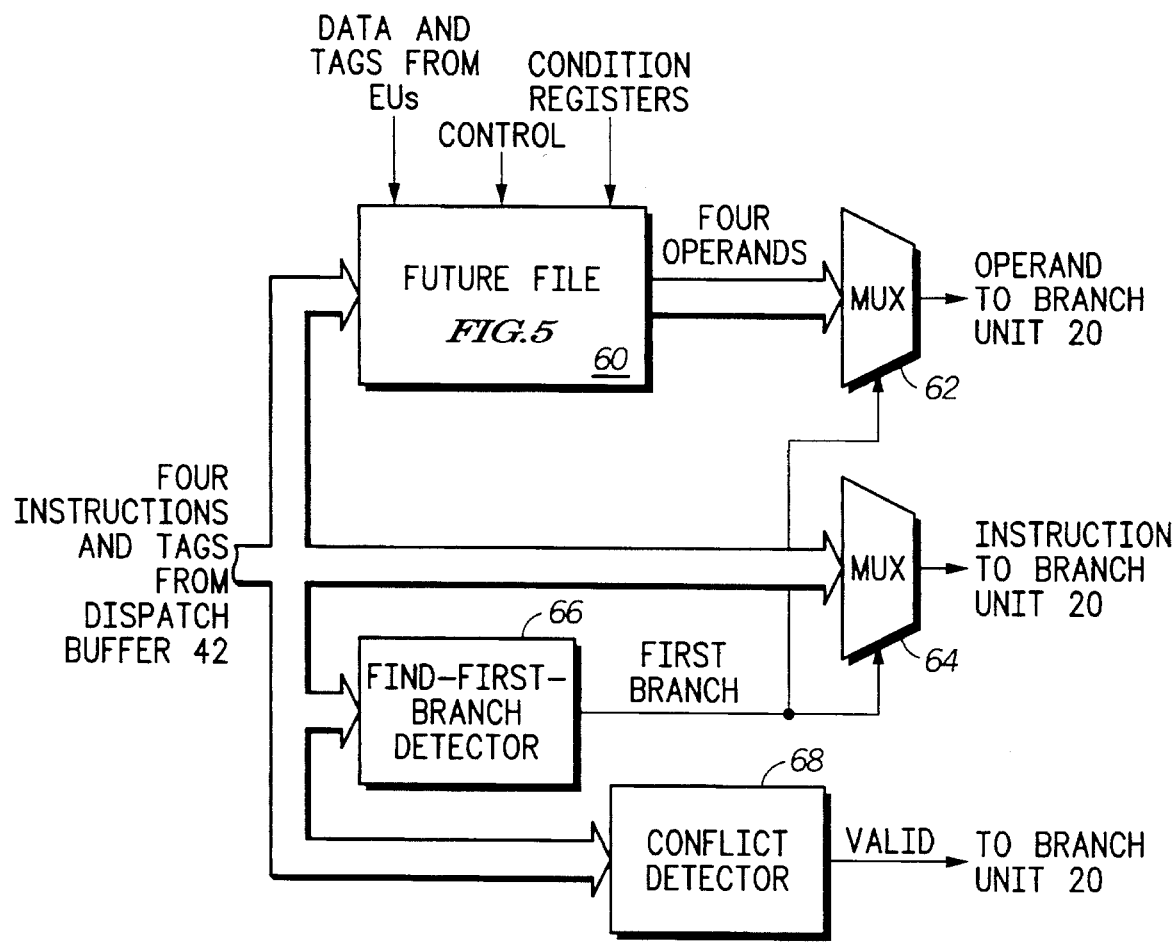
FIG. 4 depicts a block diagram of the branch dispatch control unit depicted in FIG. 3.

FIG. 4 depicts a block diagram of branch dispatch control unit 48 depicted in FIG. 3. Branch dispatch control unit 48 receives up to four instructions each clock cycle from dispatch buffer 42 and forwards one of the four instructions to branch unit 20 for execution. A future file 60 supplies one operand for each of the four instructions as indicated by a field in each instruction's opcode. Future file 60 is more fully described below in connection with FIGS. 5 through 8. A multiplexer 62 and a multiplexer 64 select one of the four operand-instruction pairs responsive to an output first branch signal of a find-first-branch detector 66. Find-first-branch detector 66 also receives the four dispatched instructions, decodes the four instructions or "opcodes," and selects the first occurring branch instruction in the group of four instructions for execution. A conflict detector 68 asserts a valid control signal if the find-first-branch detector 66 finds a branch instruction and if the branch instruction does not depend on the result of a prior instruction in dispatch buffer 42, a data dependency.

The depicted embodiment is a sixty-four bit implementation of the PowerPC architecture. (PowerPC is a trademark of International Business Machines Corporation.) Branch unit 20 uses one or none of eight condition registers ("CR-0" through "CR-7") as an operand in a branch instruction. Future file 60 stores and supplies the most recent value of each of the eight condition registers with respect to the original program order. At dispatch time, branch unit 20 need not search any other location, such as rename buffer 34, for this data. Also, as will be described below, future file 60 can correct all of its data in a single cycle in the event of an instruction exception (data overflow, data underflow, divide-by-zero, etc.), a branch instruction misprediction, a data misalignment, a system reset, etc.: "an exception condition".

FIG. 5 depicts a block diagram of future file 60 depicted in FIG. 4. Future file 60 has an entry for each mirrored architectural register (only entry-0 and entry-7 are depicted), multiplexers 70, 72, 74, and 76, and a future file control unit 78. Each entry stores the most recent value with respect to the original program order of a differing one of the eight condition registers, a result destination tag, and a valid bit in a latch 80, a latch 82, and a latch 84, respectively.

Latch 80 receives a four-bit condition register from the output of an eight-to-one multiplexer 86. Latch 80 in the Ith entry of future file 60 receives the Ith condition register, where I is an integer. The inputs of multiplexer 86 receive the contents of the Ith architectural register, the six results operands generated by the six execution units and the prior value of latch 80. An output of future file control unit 78 selects which of the eight inputs multiplexer 86 outputs to latch 80.

Latch 82 receives a four-bit result destination tag from the output of a five-to-one multiplexer 88. The inputs of multiplexer 88 receive the four result destination tags associated with the four instructions in dispatch buffer 42 and the prior value of latch 82. An output of future file control unit 78 selects which of the five inputs multiplexer 88 outputs to latch 82.

Latch 74 receives a one-bit valid bit from future file control unit 78.

Multiplexers 70, 72, 74 and 76 function as the four output ports of future file 60. Each one of multiplexers 70, 72, 74 and 76 receives eight nine-bit inputs from the eight entries of future file 60 (four condition register bits, four result destination tag bits and one valid bit per entry). A particular field within a differing one of the four dispatched instructions selects a differing one of the four outputs of multiplexers 70, 72, 74 and 76. These outputs are forwarded to multiplexer 62. As described above, branch unit 20 receives the contents of one entry from multiplexer 62.

The operation of future file 60 is described below in connection with FIGS. 6 through 8.

It should be understood that future file 60 may be implemented in a variety of other ways. For instance, future file 60 may be implemented as a multi-ported register file. In a multi-ported register file, a binary decoder connects the bit cells of a particular entry to a set of bit lines responsive to a binary address. The contents of the entry may be read from by connecting a sense amplifier to the bit lines. Conversely, the contents of the entry may be written to by applying a suitably strong signal to the bit lines. Each row of bit cells in such a design stores the most recent version of one condition register, one result destination tag and the corresponding valid bit. Each port in such a design requires its own decoder, bit lines, wordline transistors, and sense amplifier or input driver.

In general, future file control unit 78 performs three functions for each of its eight entries. First, future file control unit 78 snoops all dispatched instructions to determine which, if any, of them modify a condition register. Future file control unit 78 stores the result destination tag of any instruction that so modifies a condition register in latch 82 of the entry corresponding to the modified condition register. This procedure allows future file 60 to maintain the most current value of each condition register or to know where the value will come from in the future. Second, future file control unit 78 snoops all executed instructions for those that it identified earlier as modifying a condition register. Future file control unit 78 stores the identified result in latch 80 of the entry corresponding to the modified condition register. Third, future file control unit 78 updates all eight entries with the values stored in the architectural condition registers if an exception condition occurs.

Figure 6:
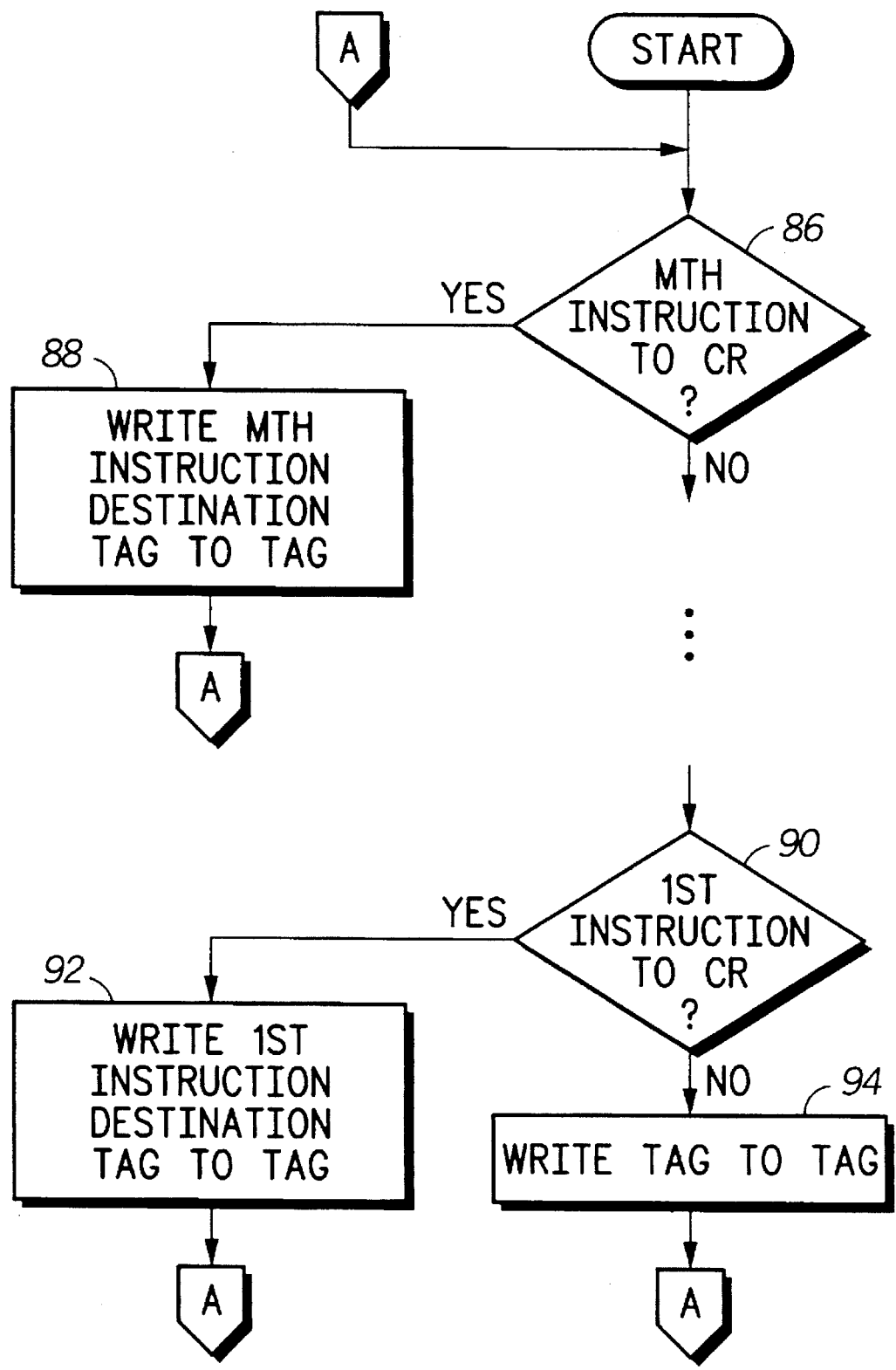
FIG. 6 depicts a flow chart illustrating the operation of each tag field depicted in FIG. 5.

FIG. 6 depicts a flow chart illustrating the operation of each tag field depicted in FIG. 5. Future file control unit 78 executes the depicted flow chart each cycle for each entry in future file 60. Future file control unit 78 examines each instruction in the group of M dispatched instructions, from youngest to oldest (Mth, M-1th, . . . , 2nd, 1st instruction). The last instruction in a series of instructions to modify any particular condition register is the youngest instruction.

Future file control unit 78 first determines if the Mth one of the dispatched instructions modifies a particular condition register, a step 86. If the Mth instruction does modify the particular condition register, then future file control unit 78 writes the result destination tag of the Mth instruction into latch 82 of the entry corresponding to the modified condition register, a step 88. Future file control unit 78 writes the result destination tag of the Mth instruction into latch 82 by selecting the corresponding input of multiplexer 88. If the Mth instruction did not modify the particular condition register, then future file 60 continues its examination of each successively older instruction. Future file control unit 78 writes the result destination tag into latch 82 if some older instruction so modifies the particular condition register, for instance, steps 90 and 92. It should be noted that future file control unit 78 only writes one (or no) destination tag into latch 82. Future file control unit 78 returns to step 86 after it identifies the first instruction modifying the particular condition register. If none of the M instructions modifies the particular condition register, then future file control unit 78 writes the contents of latch 82 back into latch 82, a step 94, and returns to step 86.

Figure 7:
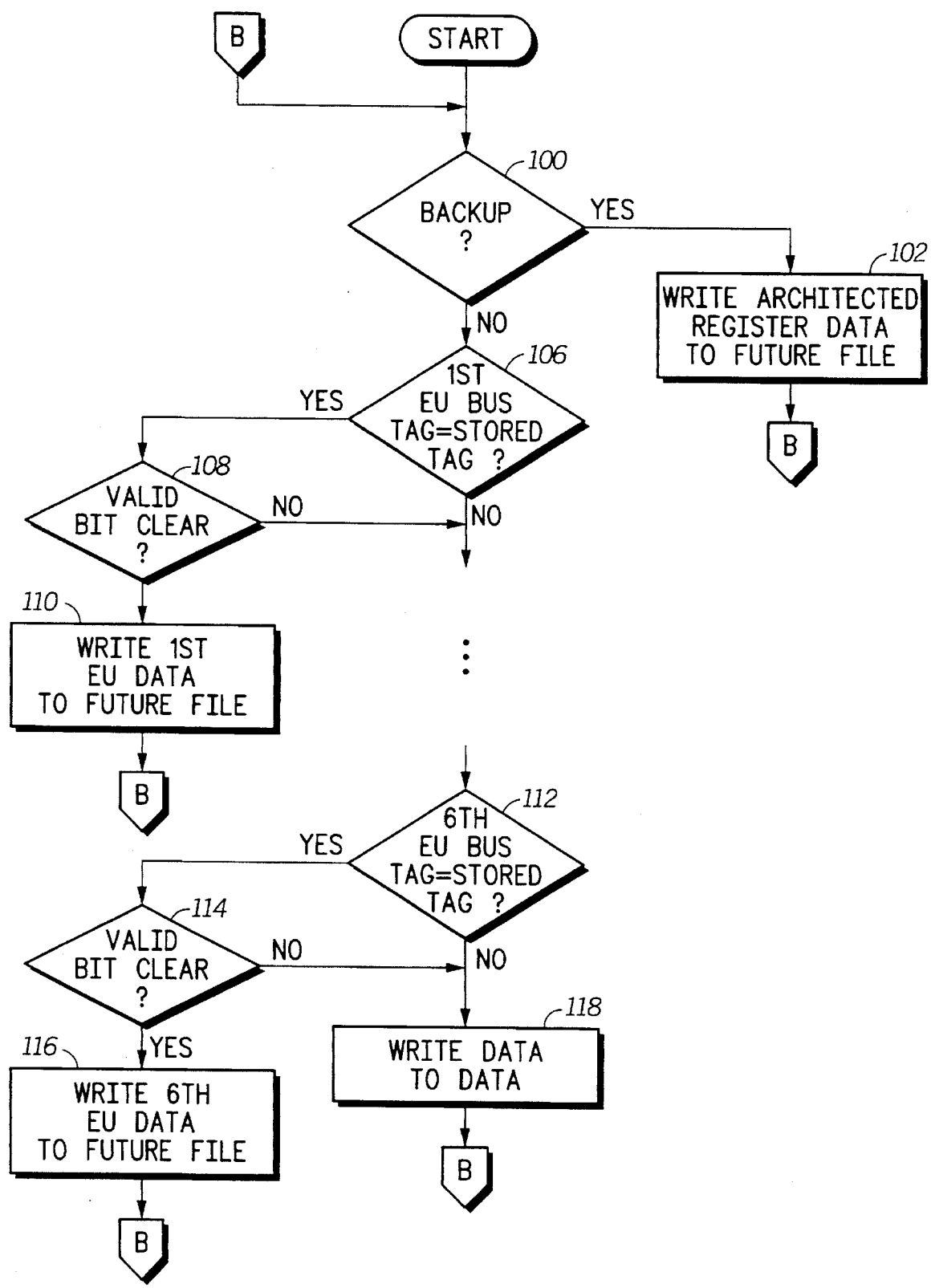
FIG. 7 depicts a flow chart illustrating the operation of each data field depicted in FIG. 5.

FIG. 7 depicts a flow chart illustrating the operation of each data field depicted in FIG. 5. Future file control unit 78 examines each executed instruction's result destination tag, up to six results each cycle.

Future file control unit 78 first determines if an exception condition occurred ("BACKUP"), a step 100. If a backup condition occurred, then future file control unit 78 writes the contents of each architectural register to the corresponding entry in future file 60, a step 102. This data correction step requires only one cycle because the eight condition registers are connected in parallel to the eight entries of future file 60. Future file control unit 78 then returns to step 100 to begin its snooping operation in the next cycle.

If no backup condition occurred, then future file control unit 78 compares the tag stored in latch 82 with all of the result destination tags returned by the various execution units after instruction execution. Future file control unit 78 first determines if the first result destination tag is logically equivalent to the contents of latch 82, a step 106. If the first result destination tag is logically equivalent to the contents of latch 82, then future file control unit 78 confirms that the valid bit is clear, a step 108. If the first result destination tag is logically equivalent to the contents of latch 82 and the entry's valid bit is clear, then future file control unit 78 writes the instruction result corresponding to the equivalent result destination tag into latch 80, a step 110. Future file control unit 78 writes the instruction result into latch 80 by selecting the corresponding input of multiplexer 86. If the first result destination tag is not logically equivalent to the contents of latch 82 or if the entry's valid bit is not clear, then future file 60 continues its examination of each result destination tag. Future file control unit 78 writes the instruction result into latch 80 if some other result destination tag is logically equivalent to the contents of latch 82 and the entry's valid bit cleared, for instance, steps 112, 114, and 116. It should be noted that data processor 10 only executes one instruction at a time identified by any particular result destination tag. Therefore, future file control unit 78 only writes one (or no) instruction result into latch 80. Future file control unit 78 returns to step 100 after it finds a match between the stored and received results destination tags. If none of the result destination tags are logically equivalent to the contents of latch 82, then future file control unit 78 writes the contents of latch 80 back into latch 80, a step 118 and returns to step 100. Future file control unit 78 executes steps 100 through 118 each cycle for each entry in future file 60.

Figure 8:
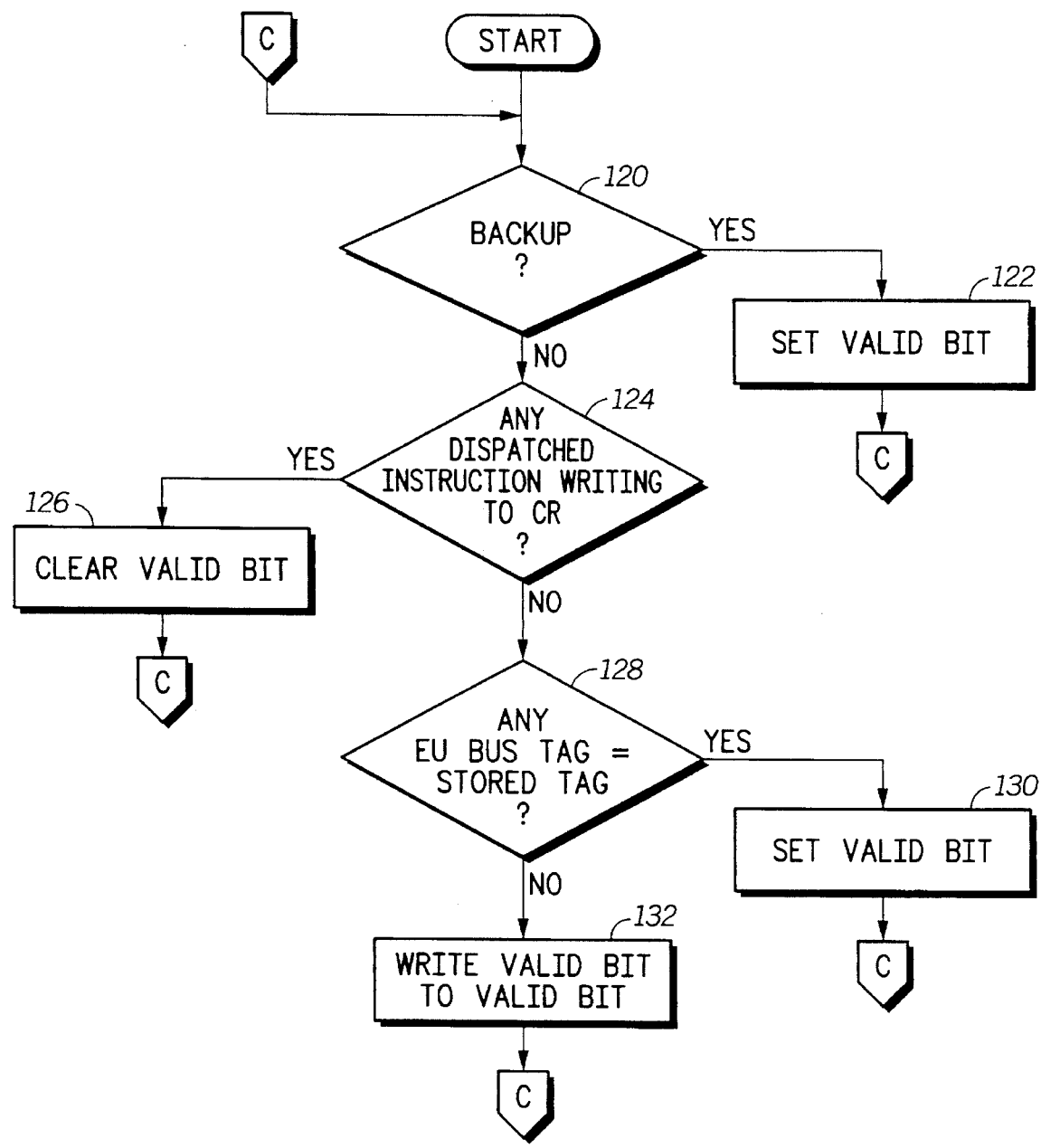
FIG. 8 depicts a flow chart illustrating the operation of each valid bit depicted in FIG. 5.

FIG. 8 depicts a flow chart illustrating the operation of each valid bit depicted in FIG. 5. Future file control unit 78 executes the depicted flow chart each cycle for each valid bit in future file 60. Future file control unit 78 first determines if a backup condition occurred, a step 120. If a backup condition occurred, then future file control unit 78 sets the entry's valid bit, a step 122. A set valid bit indicates to branch unit 20 that it can use the data stored in the corresponding entry. If a backup condition did not occur, then future file control unit 78 determines if any of the M dispatched instructions will modify the condition register, a step 124. If any of the M dispatched instructions will modify the condition register, then future file control unit 78 will clear the entry's valid bit, a step 126. A cleared valid bit indicates to branch unit 20 to wait for the result identified by the entry's result destination tag. If none of the M dispatched instructions will modify the condition register, then future file control unit 78 determines if any of the executed instructions has a result destination tag matching the entry's stored result destination tag, a step 128. If one of the executed instructions has a result destination tag matching the entry's stored result destination tag, then future file control unit 78 sets the entries valid bit, a step 130. If none of the executed instructions has a result destination tag matching the entry's stored result destination tag, then future file control unit 78 writes the contents of the valid bit back to itself, a step 132. It should be noted that future file control unit 78 only writes one value to each valid bit per clock cycle. Future file control unit 78 returns to step 120 after steps 122, 126 130, and 132.

Although the present invention has been described with reference to a specific embodiment, further modifications and improvements will occur to those skilled in the art. For instance, the disclosed invention may be incorporated into data processors traditionally classified as complex instruction set computers or CISC machines. Certain functional units may be omitted in certain embodiments or relocated to other areas of data processor 10. Also, the disclosed future file may be used to supply one or more operands to other execution units in data processor 10. It is to be understood therefore, that the invention encompasses all such modifications that do not depart from the spirit and scope of the invention as defined in the appended claims.

I claim:

1. A data processor with a future file providing operand data to an execution unit, the data processor comprising:

a plurality of architectural registers;

an execution unit executing an instruction of a series of instructions, the instruction designating a specific one of the plurality of architectural registers as a destination;

a rename buffer coupled to the plurality of architectural registers and to the execution unit, the rename buffer buffering results generated by the series of instructions, the rename buffer storing a result of the instruction, the rename buffer copying the result to the specific one of the plurality of architectural registers at a specific time, the specific time responsive to an order of the instruction within the series of instructions; and a future file comprising a plurality of entries coupled to the execution unit, the future file providing a single source lookup for instruction operands, each one of the plurality of entries storing a most recent value of a differing one of the plurality of architectural registers with respect to the series of instructions, each one of the plurality of entries providing the most recent value to the execution unit responsive to the instruction, each one of the plurality of entries coupled to a differing one of the plurality of architectural registers, each one of the plurality of entries simultaneously storing a value of a differing one of the plurality of architectural registers responsive to an occurrence of an exception condition via a differing one of a plurality of future file buses.

2. The data processor of claim 1 wherein each of the plurality of entries comprises a tag means for storing a tag identifying one of the series of instructions and wherein the future file provides the tag to the execution unit.

3. The data processor of claim 2 wherein each one of the plurality of entries comprises:

a multiplexer, a first input of the multiplexer coupled to a differing one of the plurality of architectural registers, a second input of the multiplexer coupled to an output of a first latch, and a third input of the multiplexer coupled to an output of the execution unit;

the first latch, an input of the first latch coupled to an output of the multiplexer;

a second latch; and wherein the future file comprises a control unit coupled to the multiplexer in each one of the plurality of entries, the control unit coupling the differing one of the plurality of architectural registers to the output of the multiplexer if an exception condition occurs as the most recent value of the differing one of the plurality of architectural registers, the control unit coupling the output of the execution unit to the output of the multiplexer if a value stored in the second latch is logically equivalent to a portion of the output of the execution unit as the most recent value of the differing one of the plurality of architectural registers, otherwise the control unit coupling the output of the first latch to the input of the first latch as the most recent value of the differing one of the plurality of architectural registers.

4. The data processor of claim 3 wherein the rename buffer copies the result to the plurality of architectural registers responsive to the instruction and to the series of instructions.

5. The data processor of claim 4 wherein the instruction is a branch instruction.

6. The data processor of claim 1 wherein each one of the plurality of entries comprises:

a multiplexer, a first input of the multiplexer coupled to a differing one of the plurality of architectural registers, a second input of the multiplexer coupled to an output of a first latch, and a third input of the multiplexer coupled to an output of the execution unit;

the first latch, an input of the first latch coupled to an output of the multiplexer;

a second latch storing a tag identifying a next most recent value of the differing one of the plurality of architectural registers; and wherein the future file comprises a control unit coupled to the multiplexer in each one of the plurality of entries, the control unit coupling the differing one of the plurality of architectural registers to the output of the multiplexer if an exception condition occurs as the most recent value of the differing one of the plurality of architectural registers, the control unit coupling the output of the execution unit to the output of the multiplexer if a value stored in the second latch is logically equivalent to a portion of the output of the execution unit as the most recent value of the differing one of the plurality of architectural registers, otherwise the control unit coupling the output of the first latch to the input of the first latch as the most recent value of the differing one of the plurality of architectural registers.

7. The data processor of claim 6 wherein the rename buffer copies the result to the plurality of architectural registers responsive to the instruction and to the series of instructions.

8. The data processor of claim 7 wherein the instruction is a branch instruction.

9. The data processor of claim 1 wherein the rename buffer copies the result to the plurality of architectural registers responsive to the instruction and to the series of instructions.

10. The data processor of claim 9 wherein the instruction is a branch instruction.

11. The data processor of claim 1 wherein the instruction is a branch instruction.

12. A method of operating a data processor with a future file providing operand data to an execution unit, the data processor spectulatively executing instructions, the method comprising the steps of:

during a first time, receiving an instruction for execution in an execution unit of a data processor, the instruction of a series of instructions, the instruction specifying a source operand; and providing a most recent value of one of a plurality of architectural registers responsive to the source operand and to the execution unit from a future file, the most recent value stored in one of a plurality of entries of the future file, the future file providing a single source lookup for instruction operands, the plurality of entries coupled to the execution unit, each one of the plurality of entries storing a most recent value of a differing one of the plurality of architectural registers, each one of the plurality of entries coupled simultaneously to a differing one of the plurality of architectural registers for single cycle replacement of the future file responsive to an occurrence of an exception condition via a differing one of a plurality of future file buses.

13. The method of claim 12 further comprising the steps of:

during a second subsequent time;

receiving a signal representative of an exception condition in the future file; and simultaneously writing a value of each of the plurality of architectural registers to the differing one of the plurality of entries.

14. The method of claim 13 wherein the step of providing further comprises the step of providing a tag to the execution unit identifying one of the series of instructions.

15. The method of claim 14 further comprising the steps of:

writing a result of the instruction to a rename buffer; and copying the result to one of the plurality of architectural registers responsive to the instruction and to the series of instructions.

16. The method of claim 15 wherein the instruction is a branch instruction.

17. The method of claim 12 wherein the step of providing further comprises the step of providing a tag to the execution unit identifying one of the series of instructions.

18. The method of claim 17 further comprising the steps of:

writing a result of the instruction to a rename buffer; and copying the result to one of the plurality of architectural registers responsive to the instruction and to the series of instructions.

19. The method of claim 18 wherein the instruction is a branch instruction.

20. The method of claim 12 further comprising the steps of:

writing a result of the instruction to a rename buffer; and copying the result to one of the plurality of architectural registers responsive to the instruction and to the series of instructions.

* * * * *